United States Patent
Park

(10) Patent No.: US 7,515,142 B2
(45) Date of Patent: Apr. 7, 2009

(54) SCROLLING METHOD AND MOBILE COMMUNICATION TERMINAL USING THE SAME

(75) Inventor: Eunyoung Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 11/853,677

(22) Filed: Sep. 11, 2007

(65) Prior Publication Data

US 2008/0062207 A1 Mar. 13, 2008

(30) Foreign Application Priority Data

Sep. 12, 2006 (KR) .................. 10-2006-0088095

(51) Int. Cl.
*G09G 5/00* (2006.01)
*G06F 3/048* (2006.01)

(52) U.S. Cl. ...................................... 345/173; 715/784

(58) Field of Classification Search .................. 345/156, 345/173–181; 341/22; 382/181–189
See application file for complete search history.

(56) References Cited

U.S. PATENT DOCUMENTS

| 5,864,330 | A * | 1/1999 | Haynes ........................ 715/856 |
| 6,252,594 | B1 * | 6/2001 | Xia et al. ...................... 715/786 |
| 6,727,921 | B1 * | 4/2004 | Valad ........................... 715/810 |
| 7,245,286 | B2 * | 7/2007 | Nagata ......................... 345/156 |

FOREIGN PATENT DOCUMENTS

KR    10-20030016749 A    3/2003

* cited by examiner

*Primary Examiner*—Duc Q Dinh
(74) *Attorney, Agent, or Firm*—Birch, Stewart, Kolasch & Birch, LLP

(57) ABSTRACT

A scrolling method, which includes displaying at least one scroll icon on a screen of a touch device, sensing an operation in which one of the displayed scroll icons is touched and dragged, and scrolling the screen displayed on the touch device in a direction in which the touched scroll icon is dragged when the sensing step senses the scroll icon is touched and dragged.

8 Claims, 13 Drawing Sheets

| SCROLL UNIT SETTING |
|---|
| 1 Line Unit |
| 2 Page Unit |

(a)

| LINE UNIT SETTING |
|---|
| 1 line1 |
| 2 line2 |
| 3 line3 |
| 4 line4 |
| 5 line5 |
| 6 line6 |

(b)

| PAGE UNIT SETTING |
|---|
| 1 page1 |
| 2 page2 |
| 3 page3 |
| 4 page4 |
| 5 page5 |
| 6 page6 |

| SCROLL UNIT SETTING |
|---|
| [1] Line Unit |
| [2] Page Unit |

(a)

| LINE UNIT SETTING |
|---|
| scroll on 3 line basis |

(b)

| PAGE UNIT SETTING |
|---|
| scroll on 1 page basis |

| Telephone Directory | | Telephone Directory | | Telephone Directory | |
|---|---|---|---|---|---|
| [1] Cholso | ⇩ —310 | [8] Boksoo | ⇩ --310 | [8] Boksoo | ⇩ —310 |
| [2] Youngso | | [9] Yunkoo | | [9] Yunkoo | |
| [3] Younehee | | [10] Seongyoung | | [10] Seongyoung | |
| [4] Sungjae | | [11] Jeesoo | | [11] Jeesoo | |
| [5] Sungsoo | | [12] Minjoung | | [12] Minjoung | |
| [6] Hyeongbok | | [13] Yeonjoo | | [13] Yeonjoo | |
| [7] Youngme | ⇧ —300 | [14] Yeonhee | ⇧ —300 | [14] Yeonhee | ⇧ —300 |
| page 1 | | page2 | | page2 | |

| Telephone Directory |
|---|
| 64 Minsoo |
| 65 School |
| 66 Lee section chief |
| 67 Education Institute 1 |
| 68 Education Institute 2 |
| 69 Card company |
| 70 Card company2    ⇧ ─ 300 |
| page 10 |

(a)  (b)

(a)

(b)

(a)

(b)

SCROLLING METHOD AND MOBILE COMMUNICATION TERMINAL USING THE SAME

This nonprovisional application claims priority under 35 U.S.C. § 119(a) on Korean Patent Application No. 10-2006-0088095 filed in Korea on Sep. 12, 2006, the entire contents of which are hereby incorporated by reference.

BACKGROUND OF THE INVENTION

1. Field of the Invention

The present invention relates to a scrolling method and a corresponding mobile communication terminal.

2. Discussion of the Related Art

Mobile terminals are now being considered as a necessity, because of the variety of convenient services and functions provided by mobile terminals. For example, users can access the Internet, send emails and text messages, schedule meetings, watch videos and other broadcasts, and listen to music in addition to the general basic call services provided by mobile terminals.

Further, with the increase in additional functions provided by a mobile terminal, the number of input and menu options has also increased. Traversing through the variety of different menu options is often cumbersome and time consuming.

The mobile terminals also are compact in size and thus provide a scroll bar with a displayed page when the displayed page is larger than the display itself. Thus, a user can view data, which is not displayed within one screen, by scrolling the scroll bar using an arrow key, for example, provided on the terminal. However, when the data includes several pages of information, it is often cumbersome and time consuming to page through different pages in the data.

SUMMARY OF THE INVENTION

Accordingly, one object of the present invention is to address the above-noted and other problems.

Another object of the present invention is to facilitate a scrolling operation of information displayed on a mobile communication terminal.

To achieve these and other advantages and in accordance with the purpose of the present invention, as embodied and broadly described herein, the present invention provides in one aspect a scrolling method, which includes displaying at least one scroll icon on a screen of a touch device, sensing an operation in which one of the displayed scroll icons is touched and dragged, and scrolling the screen displayed on the touch device in a direction in which the touched scroll icon is dragged when the sensing step senses the scroll icon is touched and dragged.

In another aspect, the present invention provides a mobile communication terminal including a touch screen display configured to be touched by a user to input information into the terminal, and a controller configured to display at least one scroll icon on the touch screen, to sense an operation in which the at least one displayed scroll icon is touched and dragged, and to scroll information displayed on the touch screen in a direction in which the touched scroll icon is dragged.

In yet another aspect, the present invention provides a method of communicating on a mobile communication terminal. The method includes displaying a list of contact names on a display of the mobile communication terminal, in which each contact name corresponds to a telephone number of the contact name such that when the contact name is selected, the telephone number corresponding to the contact name is displayed. The method also includes displaying at least two scroll indicators on a right side of the list of contact names, and moving to a predetermined position in the list of contact names in correspondence with a touching and dragging operation of the at least two scroll indicators.

In still another aspect, the present invention provides a mobile communication terminal including a touch screen display configured to display a list of contact names, in which each contact name corresponding to a telephone number of the contact name such that when the contact name is selected, the telephone number corresponding to the contact name is displayed. Also included is a controller configured to display at least two scroll indicators on a right side of the displayed list of contact names, and to move to a predetermined position in the list of contact names in correspondence with a touching and dragging operation of the at least two scroll indicators.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 3(a)-(c) are overviews illustrating how a scroll unit is set according to a first embodiment of the present invention;

FIG. 4(a)-(c) are overviews illustrating how a scroll unit is set according to a second embodiment of the present invention;

FIGS. 7(a)-(c) are overviews illustrating a scroll icon being moved downward according to an embodiment of the present invention;

FIG. 9 is an overview illustrating a state where a scroll icon is used to scroll information down to the last page according to an embodiment of the present invention;

DETAILED DESCRIPTION OF THE INVENTION

A scrolling method and a mobile communication terminal using the same according to embodiments of the present invention will be now described with reference to the drawings.

Figure 1:
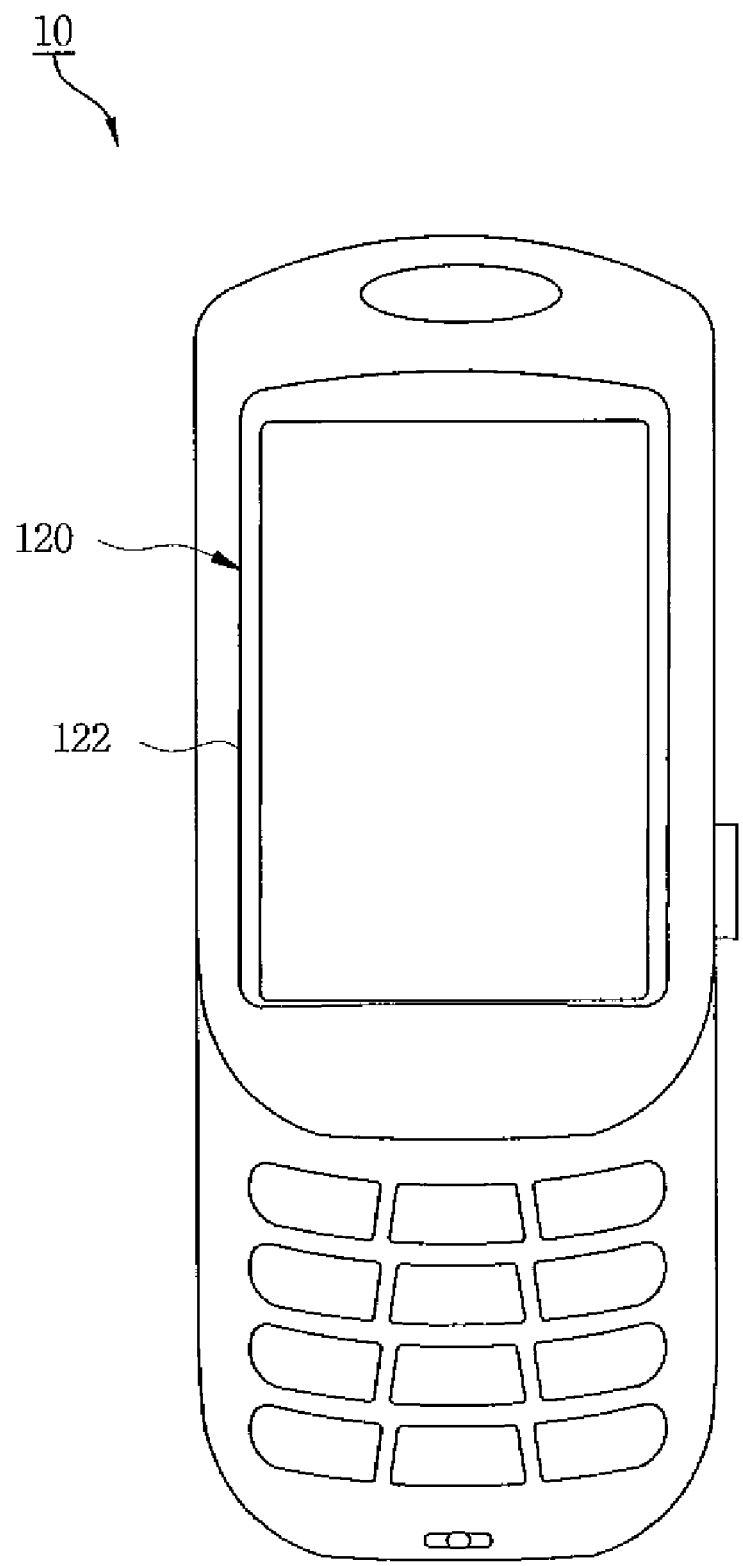
FIG. 1 is a front view of a mobile communication terminal according to an embodiment of the present invention.

FIG. 1 is a front view of a mobile communication terminal 10 according to an embodiment of the present invention. As illustrated in FIG. 1, the mobile terminal 10 includes a display unit 120 having a touch screen 122, that is, a touch device. Further, the display unit 120 displays one or more scroll icons on the touch screen 122. Thus, in this state, if the scroll icon is selected, the contents displayed on the touch screen 122 are scrolled.

Figure 2:
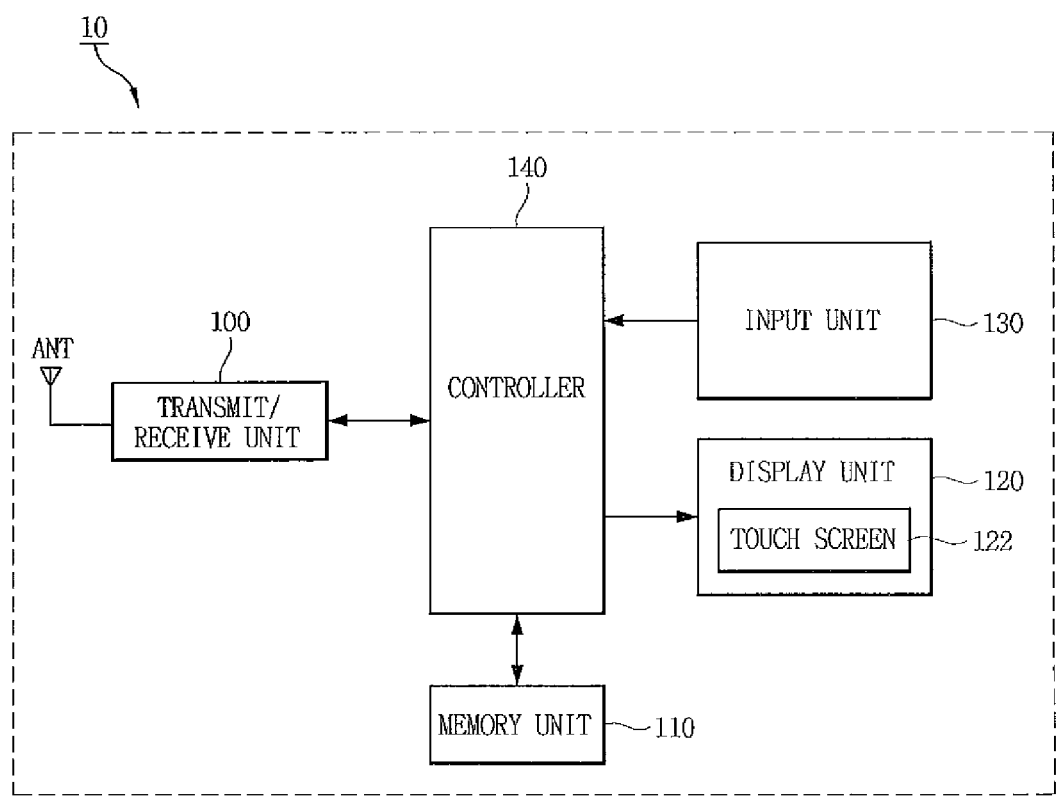
FIG. 2 is a block diagram of a mobile communication terminal according to an embodiment of the present invention.

Next, FIG. 2 is a block diagram of the mobile communication terminal 10 shown in FIG. 1. As shown, the mobile terminal 10 includes a transmit/receive unit 100, a memory unit 110, the display unit 120, an input unit 130 and a controller 140.

The transmit/receive unit 100 receives data from a base station via an antenna ANT, and transmits data, generated by the mobile terminal 10, to the base station via the antenna ANT. The memory unit 110 may include a flash memory, a Read Access Memory (RAM), an Electrically Erasable Programmable Read Only Memory (EEPROM) or the like, and has a program stored therein for controlling an overall operation of the mobile communication terminal 10. The memory unit 110 also stores data such as a plurality of telephone numbers, messages, and text files.

Further, the display unit 120 displays contents received from the transmit/receive unit 100, a variety of information signals, the contents of data stored in the memory unit 110 and the like. The term "contents of data" refers to the contents corresponding to data stored in the memory unit 110 such as telephone numbers, messages, text files, etc.

Furthermore, as discussed above, the display unit 120 includes the touch screen 112. The touch screen 112 receives a touch input from a user. Also, one or more scroll icons are displayed on the touch screen 112 such that the user can scroll through data displayed on the touch screen 112 by touching and sliding or dragging the scroll icons.

In addition, the term "touch screen" refers to a screen in which an instruction is executed or the location of a cursor is moved by recognizing a portion at which the user touches the screen (e.g., with his or her finger or with a pointer, etc.). For example, the touch screen 112 can be a screen having a screen surface filled with a flow of charge current, and sensors installed around the screen surface, by employing an electrostatic method of perceiving a place at which the user touches the screen by sensing the degree of charges lost when the screen is touched. Other types of touch screens may also be used. For example, a pressure-sensitive method of responding to pressures applied to the screen surface, and an infrared method of detecting a contact location by sensing that infrared rays are precluded by using infrared rays disposed around the screen may be used.

Further, the input unit 130 includes a plurality of number keys and a variety of function keys, and outputs a signal corresponding to a particular key selected by a user to the controller 140. In addition, the controller 140 includes a Mobile Station Modem (MSM) and controls the general input and output of the mobile communication terminal 10. The controller 140 also controls one or more scroll icons displayed on the touch screen 122. For example, when the scroll icon is touched and dragged, the controller 140 scrolls a screen displayed on the touch screen 122 in a direction in which the scroll icon is dragged.

In addition, in one embodiment, the controller 140 controls the scroll icon to be transparently displayed on the touch screen 122. That is, the scroll icon has a transparent color such that the contents of data can be seen when the scroll icon overlaps the contents of data displayed on the touch screen 122. The scroll icon may also be displayed as a semi-transparent icon.

An operation of the mobile communication terminal according to the present invention will now be described. In more detail, according to embodiments of the present invention, the amount of content to be scrolled can be advantageously set by the user. This amount of content to be scrolled will hereinafter be referred to as a scroll unit.

In more detail, FIGS. 3(a)-(c) are overviews illustrating how a scroll unit is set according to a first embodiment of the present invention. FIG. 2 will also be referred to in this description. As illustrated in FIG. 3(a), the user first selects a menu for setting the scroll unit. In this instance, if the user selects "1. Line Unit", the controller 140 displays line units, which can be selected by the user, on the display unit 120 as illustrated in FIG. 3(b).

The term "line unit" means that the contents of data displayed on the screen of the touch screen 122 will be scrolled on a line basis. For example, if the scroll icon is scrolled with the scroll unit being set to 3 lines, the controller 150 scrolls the contents of data displayed on the screen of the touch screen 122 on a 3-line basis (i.e., 3 lines at a time).

In addition, the set scroll unit is also based on the distance the scroll icon is slid or dragged. For example, the controller 140 may refer to a database, which includes information correlating a distance the scroll icon is slid or dragged and the set scroll unit. Thus, if there are 10 distance increments on the touch screen 122, and the user moves the cursor one increment, the controller 140 scrolls the information three lines for each increment when the scroll unit is set at three lines.

Alternatively, the controller 140 may also scroll the displayed data in accordance with the set screen unit irregardless of how far the user moves the scroll icon. For example, if the user sets the scroll unit to be 1 page, the controller scrolls the displayed contents 1 page when the user moves the scroll icon irregardless of the distance the scroll icon is moved.

Thus, if the user selects one of the plurality of line units displayed on the display unit 120, the controller 140 stores the selected line unit in the memory unit 110. Furthermore, if the user selects "2. Page Unit" in FIG. 3(a), the controller 140 displays page units, which can be selected by the user, on the display unit 120 as illustrated in FIG. 3(c).

In addition, the term "page unit" means that the contents of data displayed on the screen of the touch screen 122 will be scrolled by a page unit. The term "page" refers to a unit displayed one screen of the touch screen 122. For example, if the scroll icon is scrolled with the scroll unit being set to 1 page, the controller 150 controls the contents of data displayed on the touch screen 122 to be scrolled on a page basis (i.e., one page at a time) based on a distance the user slides or drags the corresponding scroll bar.

FIG. 4(a)-(c) are overviews illustrating how a scroll unit is set according to a second embodiment of the present invention. As illustrated in FIG. 4(a), the user first selects a menu for setting the scroll unit. If the user selects "1. Line Unit", the controller 140 prompts the user to set a desired line unit, as illustrated in FIG. 4(b). The user can then set the line unit using a key button, for example, on the input unit 130. Thereafter, the controller 140 stores the scroll unit set by the user in the memory unit 110.

If the user selects "2. Page Unit" in FIG. 4(*a*), the controller 140 prompts the user to set a desired page unit, as illustrated in FIG. 4(*c*). The user can then set the page unit using a key button on the input unit 130. Thereafter, the controller 140 stores the scroll unit set by the user in the memory unit 110.

Figure 5:
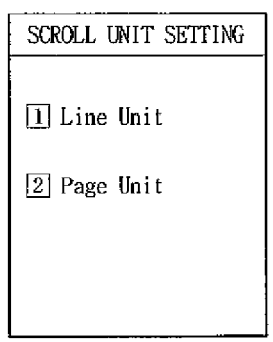
FIGS. 5(a)-(c) are overviews illustrating how a scroll unit is set according to a third embodiment of the present invention.
Figure 5:
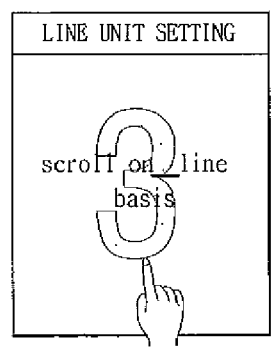
Figure 5:
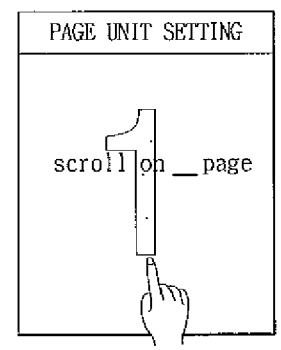

Next, FIGS. 5(*a*)-(*c*) are overviews illustrating how a scroll unit is set according to a third embodiment of the present invention. As illustrated in FIG. 5(*a*), the user first selects a menu for setting the scroll unit.

If the user selects "1. Line Unit" in FIG. 5(*a*), the controller 140 prompts the user to set a desired line unit as illustrated in FIG. 5(*b*). The user can then directly set a desired line unit by drawing the number of desired lines (e.g., 3 lines in the example of FIG. 5(*b*)) on the touch screen 122. Thereafter, the controller 140stores the scroll unit set by the user in the memory unit 110.

Similarly, if the user selects "2. Page Unit" in FIG. 5(*a*), the controller 140 prompts the user to set a desired page unit as illustrated in FIG. 5(*c*). At this time, the user can directly set a desired page unit by drawing the number of pages (i.e., 1 page in the example shown in FIG. 5(*c*)) on the touch screen 122. Thereafter, the controller 140 stores the scroll unit set by the user in the memory unit 110.

As described above, in the mobile communication terminal according to embodiments of the present invention, the contents of data are scrolled according to the scroll unit set using a variety of methods. These features are described in more detail below.

Figure 6:
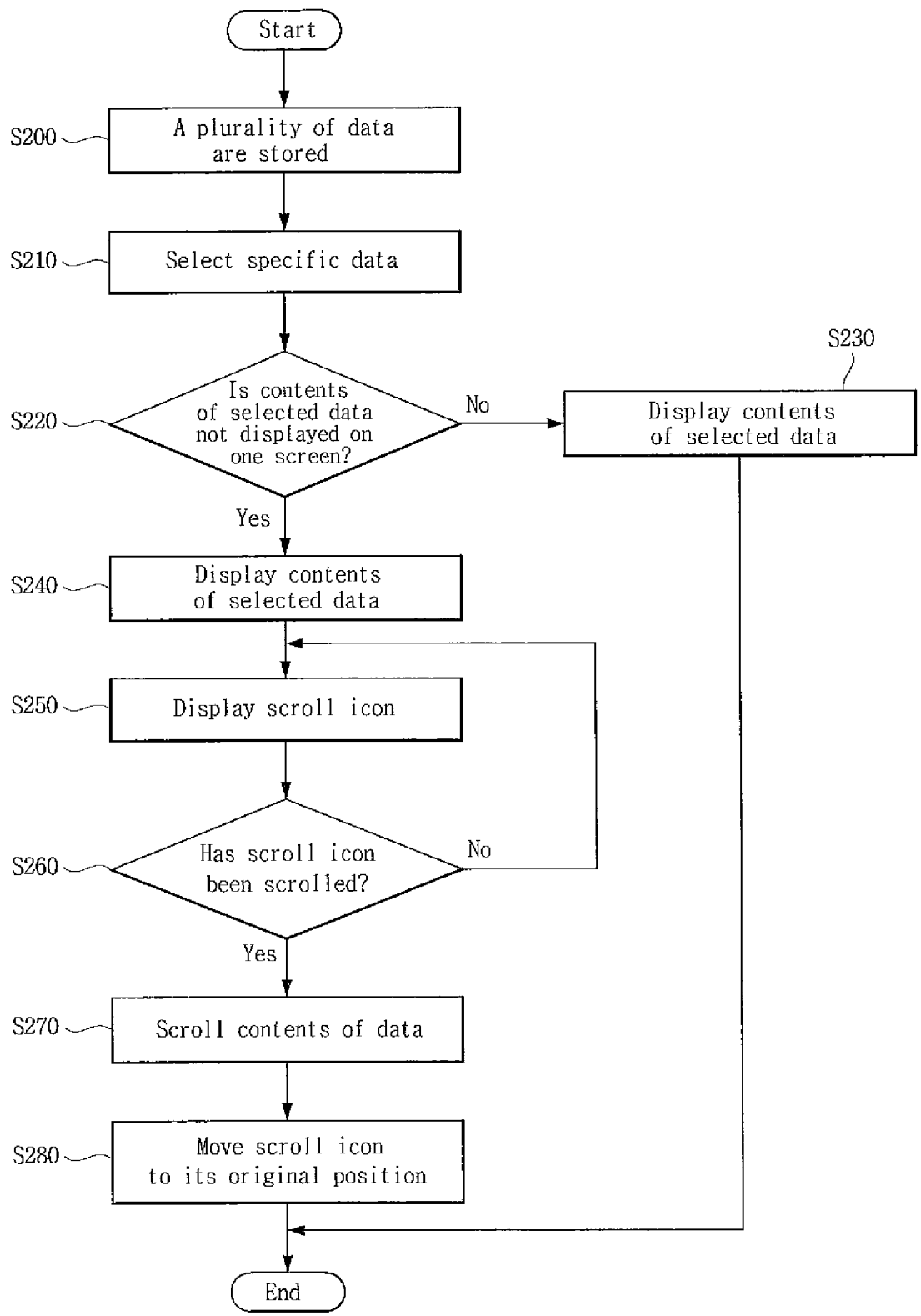
FIG. 6 is a flowchart illustrating a scrolling method in a mobile communication terminal according to an embodiment of the present invention.

FIG. 6 is a flowchart illustrating a scrolling method according to an embodiment of the present invention. In FIG. 6, steps S200 to S250 correspond to displaying one or more scroll icons on the screen of the touch device, step S260 corresponds to sensing an operation in which the scroll icon displayed in the display step is touched and dragged, and steps S270 and S280 correspond to performing an scrolling operation based on the scrolling amount set by the user and the direction and distance in which the scroll bar or scroll icon is moved.

In more detail and as shown in FIG. 6, the scrolling amount set by the user is first stored in the memory unit 110 (S200). The data to be displayed on the touch screen 122 may also be stored in the memory unit 110. For example, assume the user has set the scroll unit set to be 1 page unit. Then, in step S210, the user selects data to be viewed on the display. If the user selects a telephone directory as shown in FIG. 7(*a*), the controller 140 determines whether the contents of the telephone directory can be displayed on one screen of the touch screen 122 (S220).

If, as a result of the determination, the contents of the telephone directory can be displayed on one screen of the touch screen 122 (No in S220), the controller 140 displays the entire contents on the display unit 120 (S230). However, if the contents of the telephone directory cannot be displayed on one screen of the touch screen 122 (Yes in S220), the controller 140 only displays the contents that can be displayed on one screen of the touch screen 122 (S240). As shown in FIG. 7(*a*), the controller 140 also displays an upward scroll icon 300 and a downward scroll icon 310 on one side of the touch screen 122 (S250).

The controller 140 then determines which one of the upward scroll icon 300 and the downward scroll icon 310 is touched and scrolled (S260). If the downward scroll icon 310 is touched and dragged by the user as illustrated in FIG. 7(*b*), the controller 140 recognizes it as a scroll operation, and thus scrolls the displayed contents downwards (S270) so the user can view contents that are not originally shown on the touch screen 122.

In other words, since the scroll unit was set to 1 page, the controller 140 scrolls downward the contents of the telephone directory displayed on the touch screen 122 by one page. That is, the controller 140 controls the contents of the telephone directory displayed on the touch screen 122 to be scrolled downward by one page (i.e. the next page of contents are displayed on the touch screen 122 as shown in FIG. 7(*b*)). As discussed above, the controller 140 may scroll one page based on a predetermined distance the scroll icon is moved or irregardless of the distance the scroll icon is moved. These alternative methods may be previously selected by a user using the appropriate menu options included in the mobile terminal.

Thereafter, if the user finishes dragging the downward scroll icon 310, the controller 140 returns the scroll icon 310 to its original position as illustrated in FIG. 7(*c*) (S280).

Figure 8:
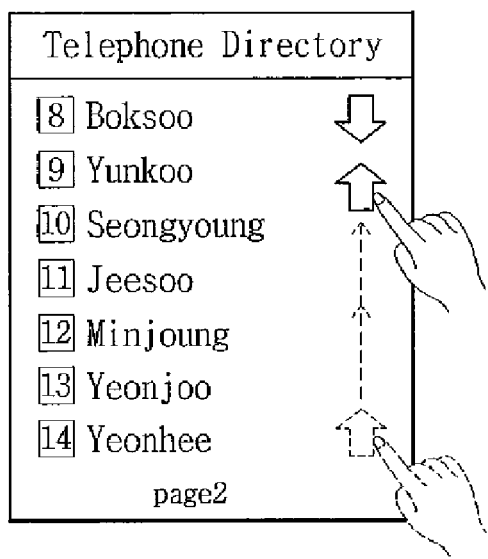
FIGS. 8(a) and (b) are overviews illustrating a scroll icon being moved upward according to an embodiment of the present invention.

In addition, FIGS. 8(*a*) and (*b*) are overviews illustrating the scroll icon being scrolled upward according to an embodiment of the present invention. As illustrated in FIG. 8(*a*), if the user touches and drags the upward scroll icon 300 after the scroll icon is moved downward by one page in FIG. 7, the controller 140 recognizes it as a scroll operation. Accordingly, the controller 140 scrolls the contents of the telephone directory upward by one page so that the contents of page 1 are displayed as illustrated in FIG. 8(*b*). The controller 140 then returns the upward scroll icon 300 to its original position. Therefore, the user can conveniently perform a next scrolling operation.

Next, FIG. 9 is an overview illustrating a state where a scroll icon is used to scroll information down to the last page according to an embodiment of the present invention. A telephone directory is also used in FIG. 9. As illustrated in FIG. 9, the contents of the telephone directory are scrolled down to the last page (i.e., page 10 in this example). Thus, the controller 140 advantageously does not display the downward scroll icon 310 of FIG. 8 on the touch screen 122. Therefore, because the controller 140 only displays the upward scroll icon 300 on the touch screen 122, the user can easily determine that the scroll icon 300 cannot be further scrolled downward because a corresponding displayed page is the last page.

In an alternative embodiment, when the contents of the telephone directory displayed on the touch screen 122 is the last page, both the upward scroll icon 300 and the downward scroll icon 310 (FIG. 8) are displayed. This feature is described in more detail below with reference to FIG. 10.

Figure 10:
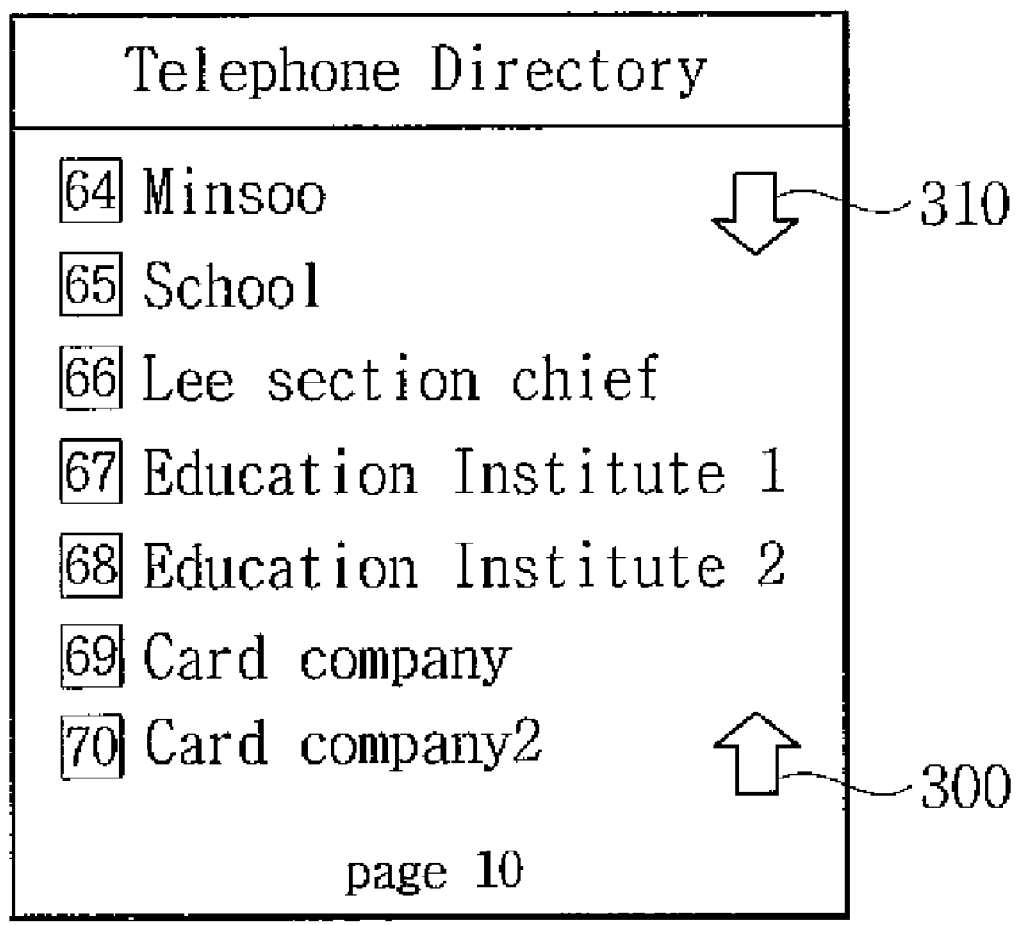
FIG. 10 is an overview illustrating a state where a scroll icon is used to scroll information down to the last page according to another embodiment of the present invention.

In more detail, FIG. 10 is an overview illustrating a state where a scroll icon is used to scroll information down to the last page according to another embodiment of the present invention. As illustrated in FIG. 10, the contents of the telephone directory are scrolled down to the last page, that is, page 10. In addition, as shown, the controller 140 displays both the upward scroll icon 300 and the downward scroll icon 310 on the touch screen 122.

In this instance, if the upward scroll icon 300 is touched and dragged, the controller 140 scrolls 1 page upward (assuming the scroll unit is set at 1 page). However, if the downward scroll icon 310 is touched and dragged, the controller 140 scrolls to the contents of the first page of the telephone directory, because there is no next page to be scrolled. Accordingly, a user can view the contents of the first page of the telephone directory by scrolling the downward scroll icon 310 when the last page of the telephone directory is displayed.

In addition, when both the upward scroll icon 300 and the downward scroll icon 310 are displayed on the touch screen 122 and page 1 of the telephone directory are displayed as shown in FIG. 7(a), and when the upward scroll icon 300 is selected, the controller 140 can also display the contents of the last page of the telephone directory, because there is no previous page to be scrolled upward.

Further, the above-mentioned embodiments illustrate the upward scroll icon 300 and the downward scroll icon 310 being displayed in the up and down directions of the touch screen 122. However, the scroll icons may be displayed in different arrangements and in different forms.

Figure 11:
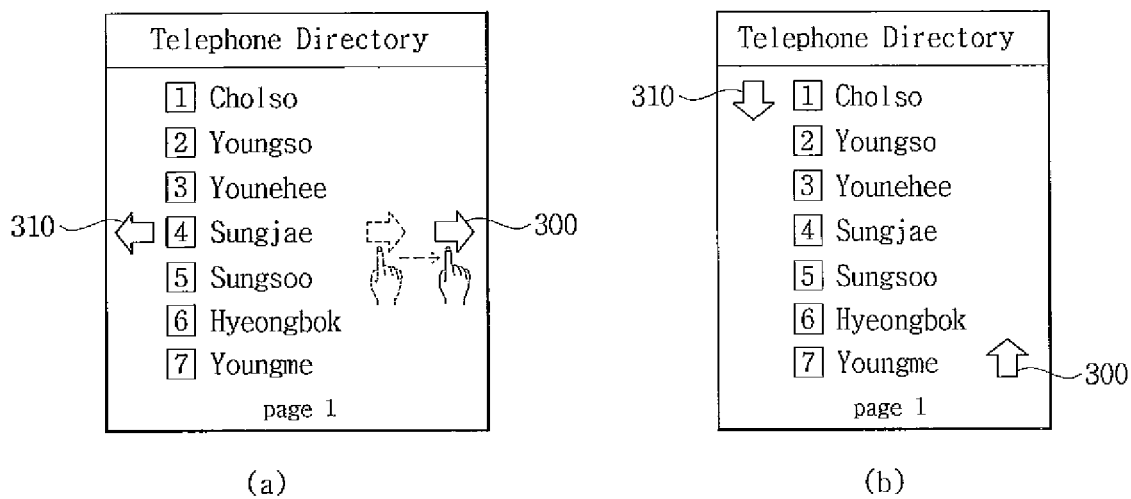
FIGS. 11(a) and (b) are overviews illustrating a scroll icon being displayed on left and right sides of a screen according to an embodiment of the present invention.

For example, FIGS. 11(a) and (b) are overviews illustrating a scroll icon being displayed on left and right sides of a screen according to another embodiment of the present invention. As illustrated in FIG. 11(a), the upward scroll icon 300 and the downward scroll icon 310 can be displayed on the left and right sides of the touch screen 122, respectively.

As illustrated in FIG. 11(b), the upward scroll icon 300 and the downward scroll icon 310 are disposed on the upper and lower sides of the touch screen 122 such that they are disposed in a diagonal direction to each other. Further, when the upward scroll icon 300 and the downward scroll icon 310 are disposed as illustrated in FIGS. 11(a) and 11(b) are touched and dragged, the controller 140 scrolls the displayed information according to the embodiments discussed above.

Figure 12:
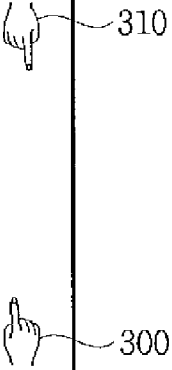
FIGS. 12(a) and (b) are overviews illustrating a scroll icon being displayed as different shapes.
Figure 12:
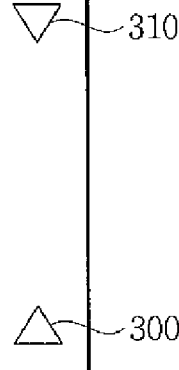

In the above-described embodiments, the upward scroll icon 300 and the downward scroll icon 310 have an arrow form. However, as shown in FIGS. 12(a) and 12(b), the scroll icons may be displayed in different shapes. In more detail, and as illustrated in FIG. 12(a), the upward scroll icon 300 and the downward scroll icon 310 are displayed as a hand with a pointing finger. Again, the scrolling operation is performed in a similar manner as described above. FIG. 12(b) illustrates the upward scroll icon 300 and the downward scroll icon 310 being formed as triangle. That is, the upward scroll icon 300 has an upward triangle shape, and the downward scroll icon 310 has an inverted triangle shape (a downward triangle shape). Accordingly, the upward scroll icon 300 and the downward scroll icon 310 indicate the scrolling direction performed by the controller 140.

In addition, the above-described embodiments illustrate the number of scroll icons being two. However, the present invention is not limited to the above embodiments. That is, the upward scroll icon 300 and the downward scroll icon 310 can be set in all directions, if appropriate. Any number of scroll icons may also be displayed. For example, upward and downward scroll icons may be displayed on both sides of the touch screen 122, which would result in four scroll icons being displayed.

Figure 13:
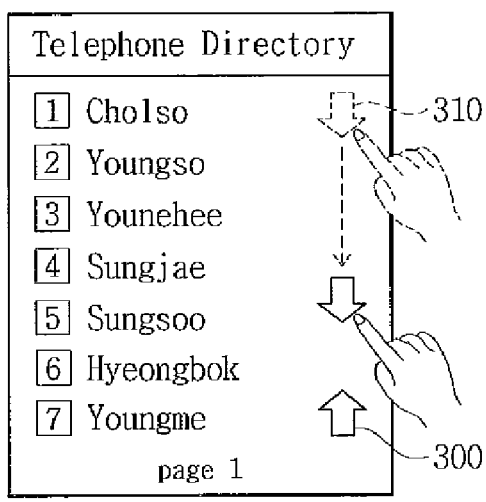
FIGS. 13(a) and (b) are overviews illustrating a scroll icon being used to scroll information on a line basis according to another embodiment of the present invention.
Figure 13:
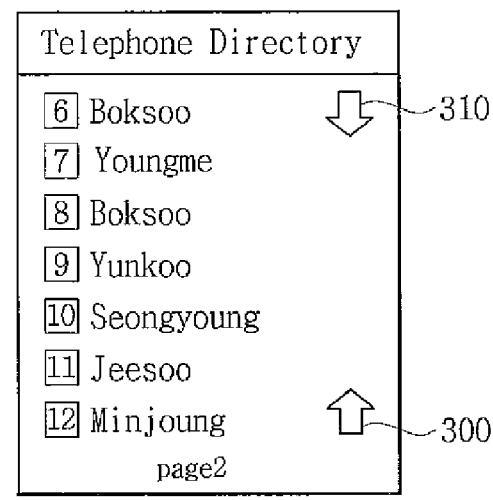

Next, FIGS. 13(a) and (b) are overviews illustrating a scroll icon being scrolled on a line basis according to another embodiment of the present invention. In more detail, when the scroll unit is set to the line unit in the memory unit 110 as illustrated in FIG. 13(a), the controller 140 scrolls the contents of the telephone directory on a line basis.

In other words, if the downward scroll icon 310 is scrolled in a state where the scroll unit is set on a 5-line basis in the memory unit 110, the contents of the telephone directory being scrolled by 5 lines are displayed on the screen of the touch screen 122, as illustrated in FIG. 13(b).

For example, assuming that one screen of the display unit 120 displays 7 lines, 5 lines are scrolled when the downward scroll icon 310 is scrolled, as illustrated in FIG. 13(b), so that 6 lines are displayed. That is, the scroll icon 310 is moved down to the fifth name in the phonebook, and the controller 140 then scrolls the information to show the sixth name in the phone book being displayed at the top of the page.

As described above, according to the present invention, the upward scroll icon 300 and the downward scroll icon 310 can be easily scrolled on a page or line basis that is advantageously set by the user.

Furthermore, the above-mentioned embodiments illustrate the displayed and scrolled contents being a telephone directory. However, the displayed and scrolled contents may be any data, photos, etc. such as character messages, multimedia messages and so on, which are received through the transmit/receive unit 100. Also, the present invention can be applied to a case where the contents of scrolled data are confirmed without displaying them on one screen of the touch screen 122, such as when confirming a text file received through the transmit/receive unit 100, and a menu list provided by the mobile communication terminal 10.

In the above embodiments, the touch screen 122 is provided over the whole area of the display unit 120. However, the present invention is not limited to the above embodiments. That is, the touch screen 122 may be provided in only some of the region of the display unit 120. In this instance, the scroll icon can also be formed in the touch screen 122 in the same manner as described above.

Further, in the above embodiments, the scroll icon is dragged and scrolled while being touched. However, the present invention is not limited to the above embodiments. That is, the scroll icon can be touched and then dragged and scrolled. Thus, a variety of operations can be recognized as a scroll operation.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

What is claimed is:

1. A scrolling method, comprising:
    displaying at least one scroll icon indicating a scrolling direction on a screen of a touch device along the scrolling direction;
    sensing an operation in which one of the displayed scroll icon is touched and dragged; and
    scrolling the screen displayed on the touch device in a direction in which the touched scroll icon is dragged when the sensing step senses the scroll icon is touched and dragged; and
    storing a scroll unit corresponding to an amount of the displayed screen to be scrolled,
    wherein the scrolling step scrolls the screen displayed on the touch device according to the stored scroll unit,
    wherein the scroll unit is a line or page unit to respectively scroll the displayed screen on a line by line basis or a page by page basis, and
    wherein the scroll unit is arbitrarily set by a user drawing on the scroll unit on the touch device.

2. The scrolling method as claimed in claim 1, wherein the touched and dragged scroll icon is returned to its original position after the dragging of the scroll icon is finished.

3. The scrolling method as claimed in claim 1, wherein the at least one scroll icon is displayed as a transparent scroll icon on the touch device.

4. The scrolling method as claimed in claim 1, wherein the at least one scroll icon is displayed on upper and lower sides, or left and right sides of the touch device.

5. The scrolling method as claimed in claim 1, wherein the touch device comprises an electrostatic touch device.

6. A mobile communication terminal, comprising:

a touch device having a display for displaying at least one scroll icon indicating a scrolling direction on a screen displayed thereon along the scrolling direction;

a controller configured to sense an operation in which one of the displayed scroll icon is touched and dragged, and to scroll the displayed screen in a direction in which the scroll icon is touched and dragged; and a memory unit configured to store a scroll unit corresponding to an amount of the displayed screen to be scrolled, wherein the controller is further configured to scroll the screen displayed on the touch device according to the stored scroll unit, wherein the scroll unit is a line or page unit to respectively scroll the displayed screen on a line by line basis or a page by page basis, and wherein the scroll unit is arbitrarily set by a user drawing on the scroll unit on the touch device.

7. The mobile communication terminal as claimed in claim 6, wherein the controller is further configured to return the touched and scrolled scroll icon to its original position after the scrolling of the scroll icon is finished.

8. The mobile communication terminal as claimed in claim 6, wherein the controller is further configured to display the at least one scroll icon as a transparent scroll icon.

* * * * *